United States Patent
Eberhard

(10) Patent No.: US 9,187,265 B2
(45) Date of Patent: Nov. 17, 2015

(54) ARRANGEMENT AND METHOD FOR PRINT PRODUCT DISTRIBUTION

(71) Applicant: TWI GmbH, Karlsruhe (DE)

(72) Inventor: Hans-Joachim Eberhard, Rheinstetten (DE)

(73) Assignee: TWI GmbH, Karlsruhe (DE)

( * ) Notice: Subject to any disclaimer, the term of this patent is extended or adjusted under 35 U.S.C. 154(b) by 118 days.

(21) Appl. No.: 13/860,165

(22) Filed: Apr. 10, 2013

(65) Prior Publication Data

US 2013/0270064 A1 Oct. 17, 2013

(30) Foreign Application Priority Data

Apr. 11, 2012 (DE) .................. 10 2012 007 094
Dec. 18, 2012 (DE) .................. 10 2012 024 698

(51) Int. Cl.
| | |
|---|---|
| *B65G 49/00* | (2006.01) |
| *B65G 43/00* | (2006.01) |
| *B65H 29/62* | (2006.01) |
| *B07C 7/00* | (2006.01) |
| *B65G 47/54* | (2006.01) |

(52) U.S. Cl.
CPC ............... *B65G 49/00* (2013.01); *B07C 7/005* (2013.01); *B65G 43/00* (2013.01); *B65H 29/62* (2013.01); *B65G 47/54* (2013.01); *B65G 2207/30* (2013.01); *B65H 2402/10* (2013.01); *B65H 2403/00* (2013.01); *B65H 2701/1932* (2013.01)

(58) Field of Classification Search
CPC ............... B07C 7/005; B65G 2207/30; B65H 2701/1932; B65H 2402/10
See application file for complete search history.

(56) References Cited

U.S. PATENT DOCUMENTS

| | | | | |
|---|---|---|---|---|
| 7,331,471 | B1 * | 2/2008 | Shakes | B07C 7/005 209/559 |
| 2004/0069849 | A1 * | 4/2004 | Stevens | G06K 7/0008 235/385 |
| 2005/0000842 | A1 * | 1/2005 | Timmerman | B26D 5/32 206/449 |
| 2008/0154425 | A1 * | 6/2008 | Driskill | B41K 3/62 700/213 |
| 2009/0188844 | A1 * | 7/2009 | Davis | B03B 9/065 209/659 |

* cited by examiner

*Primary Examiner* — Gene Crawford
*Assistant Examiner* — Thomas Randazzo
(74) *Attorney, Agent, or Firm* — Von Rohrscheidt Patents

(57) ABSTRACT

The invention is relates to an arrangement for carrying out steps in connection with a distribution of print products, so-called print product distribution. In this arrangement, devices for commissioning and devices for returning print products are combined, with at least one of the devices being involved both in the commissioning and the returning so that error-free commissioning and correct returning are performed.

11 Claims, 5 Drawing Sheets

ARRANGEMENT AND METHOD FOR PRINT PRODUCT DISTRIBUTION

RELATED APPLICATIONS

This Application claims priority from German Patent Application DE 10 2012 007 094.2 filed on Apr. 11, 2012 and German Patent Application DE 10 2012 024 698.6 filed on Dec. 18, 2012, both of which are incorporated in their entirety by this reference.

FIELD OF THE INVENTION

The invention relates to an arrangement for carrying out steps in conjunction with the distribution of print products, so-called print product distribution, and a method for carrying out steps by means of this arrangement.

BACKGROUND OF THE INVENTION

Freedom of press is a valuable civic liberty. Therefore, the distribution of print products and the return right in particular have great importance for every democracy. In conjunction with the distribution of print products, several steps have to be carried out. First of all, certain print products have to be assigned to particular customers, while it has to be assured that the print products are delivered to customers punctually and reliably. These steps are referred to as commissioning. Commissioning can be carried out semi automatically or manually by means of suitable devices, with the required handling steps being carried out by commissioners, hereinafter referred to as "pickers".

In order for customers to be fully reimbursed for the purchase price of print products which have not been sold and are returned, a return has to be carried out as an additional method step. The returned goods are recognized, counted and processed by means of detection systems. Based on the results of the method, the accounts are settled with customers and, above all, with the publishing houses which have to pay everything. Suitable devices are required for the return.

The devices which are required for the distribution of print products in connection with the above-mentioned steps, commissioning and returning, are very labor intensive and, above all, very expensive. Therefore they cannot be used in some countries.

BRIEF SUMMARY OF THE INVENTION

It is an object of the invention to configure the devices required for commissioning and returning so that they can be produced in a simple and in a cost-effective manner and can moreover be operated easily and without having particular knowledge. The object is achieved by combining devices for commissioning and returning of print products, wherein at least one of the devices is involved both in commissioning and in returning so that by using the arrangement both an error-free commissioning and a correct returning can be carried out.

The object is advantageously achieved by an arrangement for performing steps associated with a distribution of print products, the arrangement comprising devices for commissioning print products; and devices for returning a portion of the print products, wherein the devices for commissioning the print products and the devices for returning the portion of the print products are combined into modules, wherein at least one of the devices involved in the commissioning of the print products is also involved in the returning of the portion of the print products so that an error-free commissioning and a correct returning is performed.

The object is also advantageously achieved by a method for operating the arrangement including the steps splitting the commissioning into plural steps performed simultaneously in parallel so that each picker performs his tasks independently and his work pace is not determined by a work pace of other pickers.

The arrangement in accordance with the invention is relatively small and can therefore be easily transported. Furthermore, it can be produced in a very cost-efficient manner. The production costs are more than 50% lower than the costs for known arrangements. As the weight of such an arrangement is not greater than 200 kg, it can be sent by air freight. That is why it can be particularly used in so-called emerging countries where people used as pickers are only low skilled or not skilled at all. As a result, serious difficulties have so far occurred regarding return settlement with known arrangements. Return settlement, however, is one of the most important prerequisites of freedom of the press. Similar difficulties are encountered in known arrangements during in print product delivery. In this context, it must be read from a pick ticket, which causes errors over and over again and again due to inadequate reading skills.

The arrangement according to the invention is configured so that it has several identical modules with two motors each which can run both forward and backward, with the first motor serving as drive motor and being provided with a label path sensor for the drive, while the second motor is arranged with a label path sensor for the gate motor provided for the gate in such a way that the drive motor is arranged hanging downwards at an angle and—on the drive shaft of a gearbox—has a big pulley for a round belt which drives a quick-release axle on the output side of the relevant module, that two pulleys are mounted on the quick-release axle which on the right and left side of the module drive one round belt each, namely for the longitudinal transport of the stacks of return goods, and that the gate motor is built in horizontally and has a rubber roller on the drive shaft and a friction wheel that drives an additional, eccentrically supported friction wheel while the motor is rotating.

Based on this design of the arrangement according to the invention, only the drive motor and the label path sensors are needed for commissioning, while both motors and the label path sensors are needed for returning. Gear wheels can also be used instead of friction wheels.

According to another feature of the invention, twelve modules are plugged on one after the other on a cable conduit made of plastic which is put together using approx. 1 m long sections, with the cable conduit being mounted on approximately six hinged supports. Expediently, the individual modules have a length of 49 cm. This length is determined by the dimensions of the average press packages of approx. 30 by 40 cm footprint on the one hand which have to fit comfortably on one single module. On the other hand, the gaps of the closely pushed together modules must not encounter the gaps of the cable conduit. For reasons of transport, the maximum length per piece is limited to 1 m.

The arrangement according to the invention advantageously includes a number of twenty-five automatic gates for the returning which are arranged on the right and left side on a path of 6 m length formed by the modules. The path length of 6 m is a compromise based on installation conditions. If necessary, however, it can be extended to a length of 20 m and thus include 80 gates for the returning and 40 depositing points for commissioning.

In order for every picker to be able to work at his personal speed for commissioning and get paid for the work done, the pickers must not be hindered by slower colleagues. Therefore they always need an empty depositing point on the path for their finished package. With six pickers on average and twelve depositing points with a path length of 6 m, this should be the case even considering slowest picker.

In a particularly advantageous embodiment of the arrangement, the label path sensors provided on the motors include small infrared reflection light barriers which are oriented upwards with respect to a path formed by the modules and which react to objects running along the path so that a relevant motor is switched on or off. Thus, the label path sensor provided in the drive motor switches on this drive motor which will not be switched off until the drive motor of the next module starts. As a result, constant transportation is provided with low current consumption. The label path sensor in the gate motor switches the gate motor on and off. In case of short objects, the relevant gate therefore does only one pendulum stroke upward and again downward, while the rubber roller rotates twice around its axis, so that it generates about 30 cm travel to the side. In case of longer objects, for instance newspapers, the rotating roller lifts itself several times in order to eject also these big objects in a safe manner.

Since the arrangement only consumes a small amount of energy while in operation, it can be operated using simple drive means. Accordingly, a car battery is provided for driving the arrangement. Such batteries are very cost-effective and can operate the arrangement according to the invention for about eight hours.

At the end of the path, a scale can be arranged. Because of this, small counting errors can be detected and corrected. The arrangement knows the target weight for every package because all objects are weighed prior to dispatch. An incorrect package remains standing on the scale and the picker who has packed the package being alerted. Due to the advantageously provided scale, a much higher precision is achieved with the new arrangement than with arrangements known so far. Furthermore, the scale can be used to prevent the package from exceeding a weight of 8 kg in observance of international health and safety regulations.

The invention also relates to a method for carrying out steps by means of the arrangement, instead of a mere sequential working method while commissioning print products, the commissioning is now carried out by parallel division in a lot of simultaneous working steps. That way, a linear shortening of the picking time is reached with the same number of pickers. This is not possible with any other known method, neither with the "Pick by light" nor by "Pick by paper". With the method according to the invention, every picker has access to all articles and they completely finish every package without having to wait for their colleagues. At the end, the picker puts the packing slip on the package and straps the package using customary strapping material. The method thus makes it possible for every picker to work at his personal pace and to be paid exactly for that, too. This incentive is in superb contrast to a rigid zone structure, where only the slowest picker determines the total speed and no incentive wage is possible.

Instructions to pickers for carrying out steps are advantageously given by means of voice control, with every single picker getting the relevant instructions by radio via a so-called headset with microphone. By using the so far common display technology by means of voice control that has proved for decades, workers who cannot read can also be used as pickers. Almost all people of all races can hear and speak, even without a high mental capacity. Furthermore, the error rate when hearing figures is empirically smaller than for reading from a display. Voice control is therefore the means of the future.

Decisive for the high quality is the fact that every item must be confirmed individually instead of the otherwise usual package- or zone confirmation.

Since all storage locations are labeled using three figures each from 0 to 9, error-free commissioning of up to a thousand items is made possible with a small investment.

It has proven advantageous that packing slips are generated in a computer center and preferably printed by means of chain or impact printers on fan-folded paper. While doing so, nothing can get mixed up and no packing slip can get lost. Prior to every dispatch, the master computer of the arrangement generates a comprehensive commissioning plan knowing all dispatch details and the performance of the pickers, providing the result to the computer center which prints a packing slip stack on fan-folded paper for each picker. The commissioning plan may includes the entire dispatch or only a part thereof until the first break. Every packing slip bears the two-digit picker number and the sequential routing number of each customer.

After the above-mentioned step has been carried out and the arrangement has started, a method in accordance with the example stated in the following takes place: Every picker speaks the sequential routing number of their first packing slip into the microphone of the headset. Then the headset says "go to one four seven". The picker then goes to storage location 147 and repeats "one four seven". Then the headset says, "Take five". The picker then takes five specimens and repeats "five". Now the headset states the next storage location "go to one four eight", hence always in ascending order as the pallets are also put. The picker confirms the storage location by repeating the number "one four eight", then hears the number of pieces and confirms this, too. And so it goes on until the headset says, "strap". The picker now puts the packing slip on top of the package and straps the package using customary means. Following that, the picker reads the sequential routing number of the strapped package and hears "put on eight". At the same time, spot 8 opens in the RECO path on which the picker puts the finished package, saying "eight" during the method. Now the package drives away or remains standing depending on the relevant situation, because prior to that further packages from other pickers are expected which have smaller sequential routing numbers or belong to an earlier tour. The picker does not need to wait and reads the sequential routing number of his next packing slip, namely each figure individually. Now the picker has the order for his next package which he finishes in the same way.

The elements required for voice control can form a language laboratory. That way, by using relevant downloads, this provides the possibility for pickers to learn to speak English during their breaks. Both UNESCO and development assistance are very much interested in that.

A very essential further development of the invention consists in that every picker working on the arrangement gets the relevant instruction not only acoustically, that is by voice (pick by voice), but also optically at the same time. In the new arrangement, two human senses are addressed at the same time, namely hearing and seeing, and a very high picking quality is achieved.

As an embodiment of this further development, every picker is provided with a device—internally referred to as "RECO PILOT"—on which a microcomputer provided with a display is attached in addition to a loudspeaker, with up to 20,000 picking lines being stored in the microcomputer. In another embodiment of the invention, the display is formed as a color display and with every announcement (instruction" of the RECO PILOT, the color of the display changes, namely to that color in which the storage location recognition is also marked. Due to this feature of the invention a further human sense is addressed, namely the color sense. As a result, the picking quality is further increased.

Advantageously, the RECO PILOT is fastened to a wristband on which the micro-computer provided with the display and the loudspeaker is attached. Every picker wears such a wristband like a wristwatch on his wrist. Due to the formation of the arrangement according to the invention and the method involved with it, it is made possible that a lot of pickers who also work as drivers can work together in order to handle all early tours within one hour. By means of the RECO PILOT, each picking order is started and controlled in terms of time that each picker can work at full speed. During the method, the intelligent RECO path ensures adherence to the correct drive sequence.

Because the pickers get their instructions as simultaneous optical and acoustic information, with the sense of color being addressed at the same time, working at very high speeds is made possible and errors are virtually excluded. In the illuminated display, the storage location becomes visible, for example "253" and the number of specimens, for example "8". At the same time the picker hears "two-five-three", take eight". Due to this double information, the method is extraordinarily safe because no item can be forgotten and each of the many pickers can work completely independently from the other pickers.

When a package is ready, the RECO PILOT informs the picker about the number of the packing slip which is put on this package that is strapped by the picker. The correct routing sequence is achieved by the fact that—at eye level of the pickers—a display rail is located above the RECO path formed by the modules on which the pickers can see the relevant instruction. The picker puts the finished package exactly on the place of the RECO path where his picker number flashes above. That way, adherence to the correct drive sequence is ensured and all packages run over the scale in the correct order.

The arrangement according to the invention, yields additional advantages in that each picker is paid according to performance generating the greatest incentive in emerging countries and that processing time linearly decreases with every additional picker.

The microcomputer can be provided as a modified, customary MP3/MP4 player. This way, the microcomputers can be procured reasonably priced thus cheapening the RECO PILOT according to the invention.

With the arrangement extended by the RECO PILOT according to the invention, six different operation modes can be carried out which are stated in the following with their internal names:

SORT mode: sorting, channeling and collecting goods assortments in 25 boxes,

REMI mode: capturing all returns and fully automatic sorting to twenty-seven containers, RECO mode: ultrafast commissioning of the usual six to ten extremely early tours, TOUR mode: commissioning in tours with up to forty pickers at a low space requirement, LINE mode: works like a picking line with zones, but each of the two to twelve pickers can do any preparatory work TEST mode: test operation during permanent operation of the arrangement and adjustment of all drives and arrangement components.

BRIEF DESCRIPTION OF THE DRAWINGS

The arrangement and the method according to the invention are described in more detail based on an embodiment with reference to drawing Figures, wherein.

DETAILED DESCRIPTION OF THE INVENTION

Figure 1:
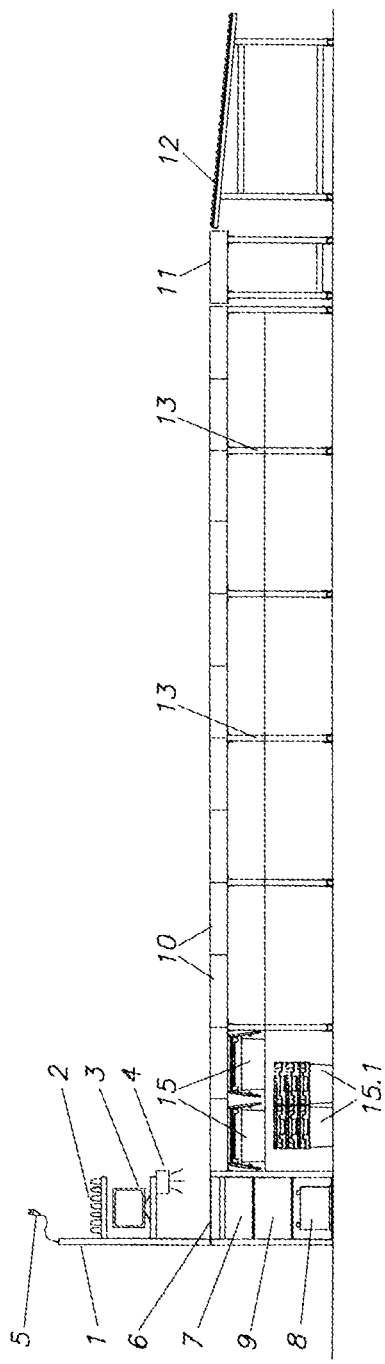
FIG. 1: Illustrates an arrangement for print product distribution in a schematic side view.
Figure 2:
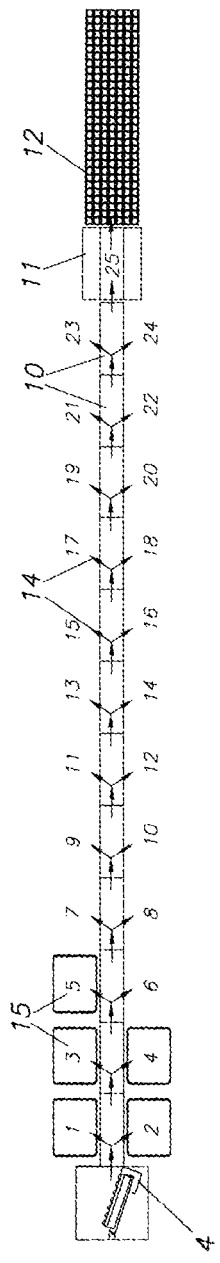
FIG. 2: Illustrates the arrangement illustrated in FIG. 1 in a schematic top view.

In the arrangement shown in FIG. 1 and FIG. 2, several objects are attached to a mast 1, namely a recharging station 2 for headsets, a notebook 3, and a scanner 4. The mast 1 receives power through a power cable 5. In a front section of the arrangement (on the left side in the drawing), a sheet of glass 6 is provided under which the control electronics 7 are located. In the lower section of the arrangement next to mast 1, there is a car battery 8 through which the arrangement is driven. The space 9 between the control electronics 7 and the car battery 8 can be used to store spare parts. Several modules 10 are located directly adjacent to the sheet of glass 6. After that, a scale 11 and a roller conveyor 12 are arranged. The modules 10 sit on six hinged supports 13.

For returning, twenty-five automatic gates 14 are provided (cf. FIG. 2), of which twenty-four are arranged on a right side and on a left side of the path formed by the modules 10, with the twenty-fifth gate 14 leading to the roller conveyor 12 via the scale 11. The return boxes 15 are fed through the gates 14. The boxes 15.1 kept as stock can be stored below the modules 10 (cf. FIG. 1).

Figure 3:
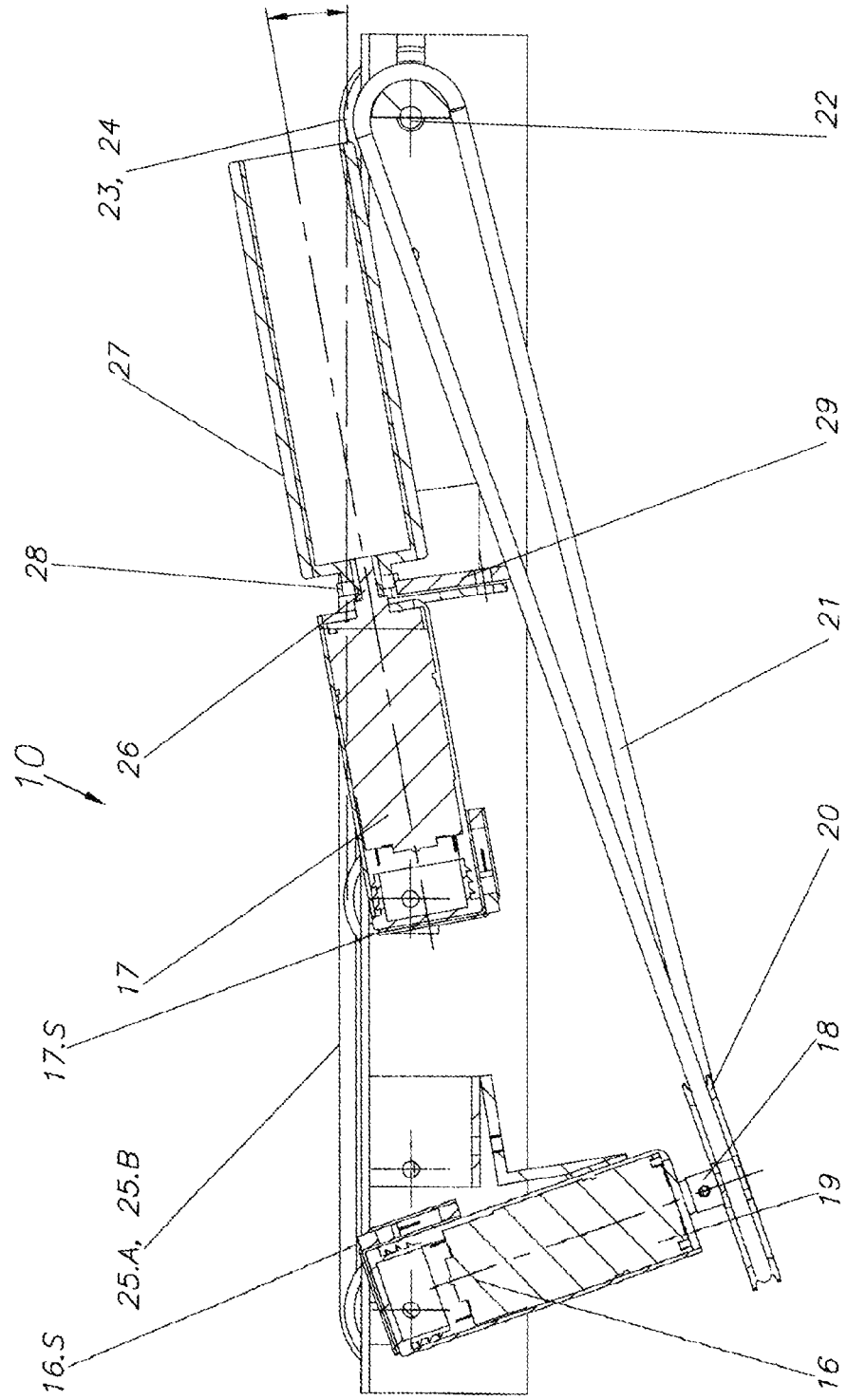
FIG. 3: Illustrates one of the modules provided several times in the arrangement—in side view.
Figure 4:
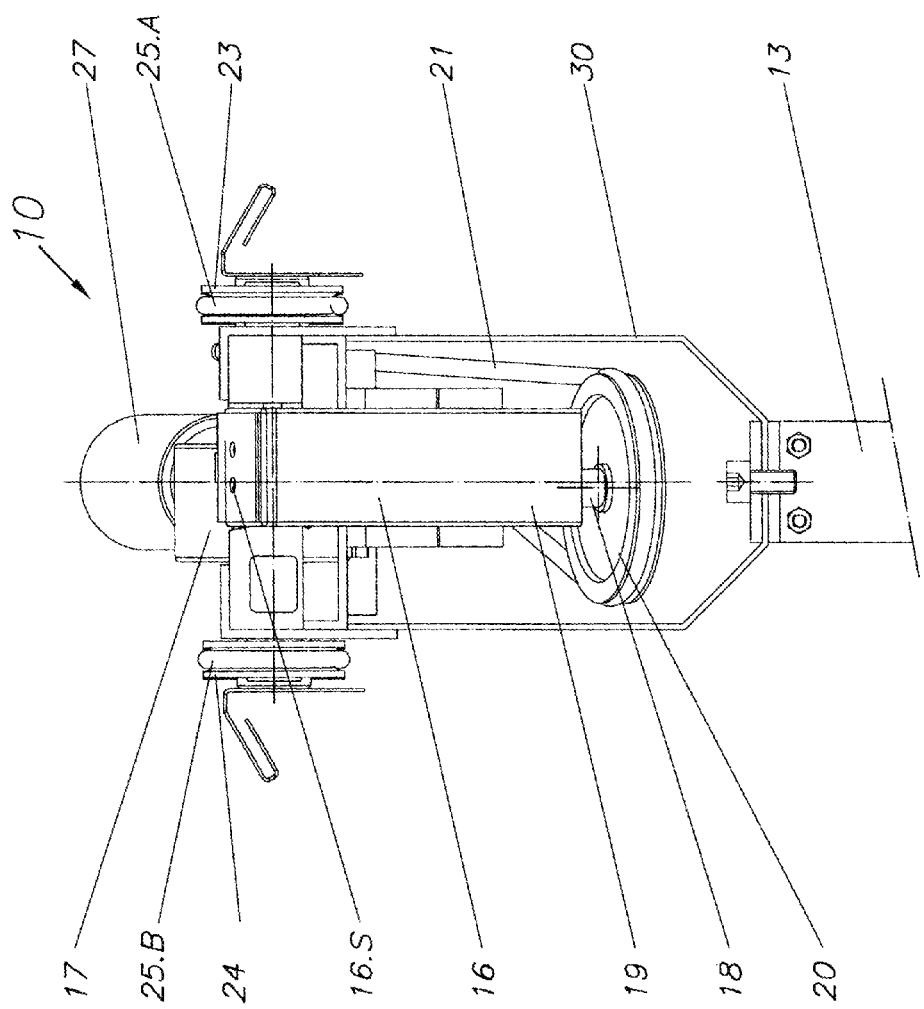
FIG. 4: Illustrates the module illustrated in FIG. 3—in front view.

The module 10 which is illustrated in FIG. 3 and FIG. 4 and provided several times in the arrangement includes two motors 16, 17 each which can both run forward and backward. The first motor serves as drive motor 16 and is provided with a label path sensor 16.5.

The second motor is configured as a gate motor 17 and provided with a label path sensor for the gate. The drive motor 16 is arranged so that it hangs downwards at an angle and—on the drive shaft 18 of a gearbox 19—has a big pulley 20 for a circular belt 21 which drives a quick-release axle 22 on the output side of the respective module 10. On the quick-release axle 22, two pulleys 23, 24 are mounted which on the right and left side each of module 10 drive one circular belt 25.A, 25.B each, namely for longitudinal transportation of the stacks or of the return goods. The gate motor 17 is installed horizontally and supports on the drive shaft 26 a rubber roller 27 and a friction wheel 28 that drives another, eccentrically supported friction wheel 29 when the motor 17 rotates.

As can be seen in FIG. 4, the modules 10 are plugged on one after the other on a cable conduit 30 made from plastic material which is put together using sections. The cable conduit 30 is supported on the hinged supports 13 (cf. FIG. 1).

Figure 5:
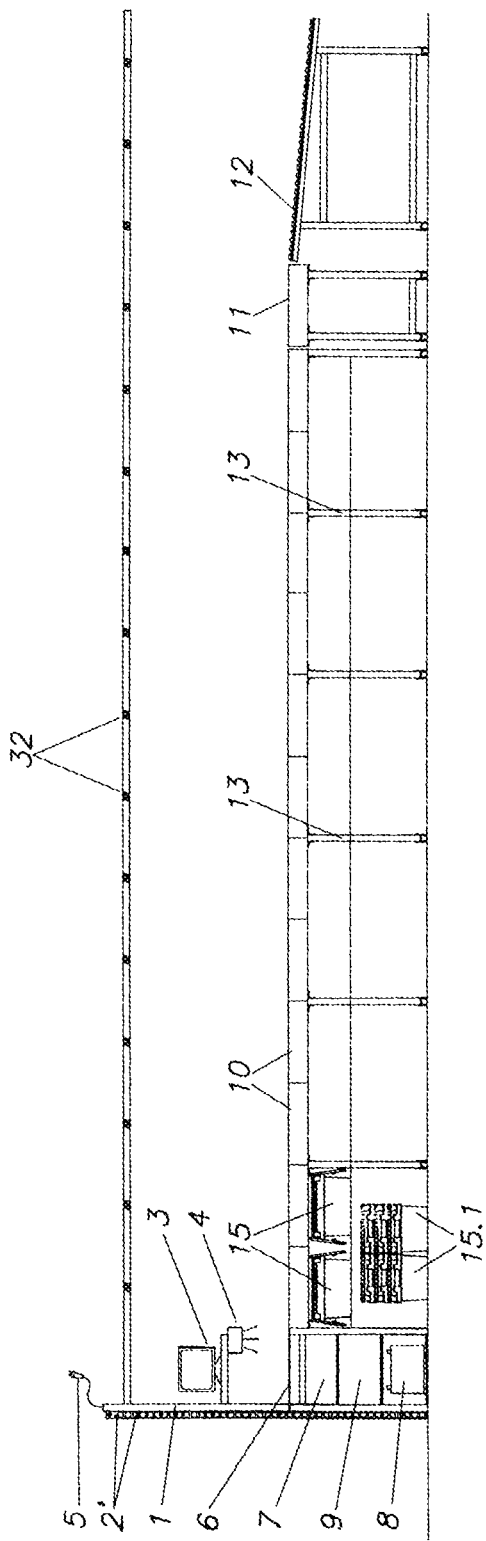
FIG. 5: Illustrates another arrangement for print product distribution in a schematic side view.

With the arrangement illustrated in FIG. 5, there are also several objects fixed on one mast 1, namely a recharging station 2 for up to forty-two RECO PILOTS 31 (cf. FIG. 6), one notebook 3, and a scanner 4. The mast 1 receives power through a power cable 5. In the front area of the arrangement (on the left in the drawing) there is provided a sheet of glass 6 under which the control electronics 7 are located. In the lower area of the arrangement which is next to mast 1, there is a car battery 8, by means of which the arrangement is driven. The space 9 between the control electronics 7 and the car battery 8 can be used to store spare parts. Directly after the sheet of glass 6 there are several modules 10. Then there is a scale 11 and a roller conveyor 12. The modules 10 sit on six supports 13. The returns are sorted by the arrangement into the boxes 15. The boxes 15.1 kept as stock can be stored below the modules 10. A display rail 32 is arranged above the RECO path which is formed by the modules 10.

Figure 6:
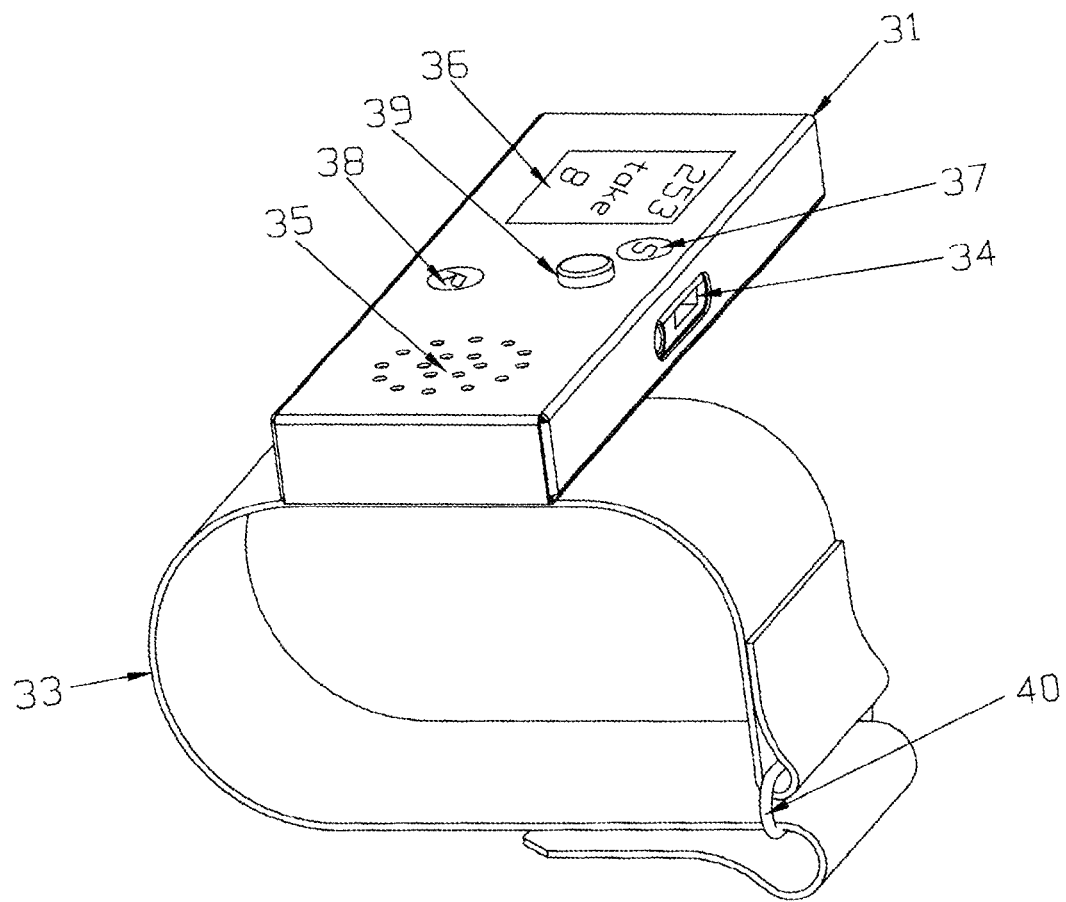
FIG. 6: Illustrates a RECO PILOT provided with a wristband for simultaneous, optical and acoustic play back of instructions intended for the picker, in perspective representation.

The RECO PILOT 31 illustrated in FIG. 6 is fixed to a wristband 33, on which a micro-computer 34 is attached that is located in a housing. The housing includes a loudspeaker 35, an illuminated color display 36 as well as a start-stop button 37 and a reverse button 38. Using the quit button 39 which is additionally provided on the housing, the picker confirms the completion of the current order line. The wristband 33 is provided with a clamp 40 which makes it possible to adapt the wristband to the circumference of the wrist of a respective picker.

What is claimed is:

1. An arrangement of modules for performing steps associated with a distribution of print products, the arrangement comprising:
    plural identical modules including a drive motor and a gate motor,
        wherein the plural identical modules are usable for the commissioning of print products and for the return of print products,
        wherein both the drive and gate motors run forward and backward,
        wherein the drive motor is provided with a label path sensor for a drive,
        wherein the gate motor is provided with a label path sensor for a gate,
        wherein the drive motor is arranged so that it hangs downward at an angle and supports a large pulley on a drive shaft of a gearbox for a first circular belt driving a quick-release axle on an output side of a module,
        wherein two pulleys are mounted on the quick-release axle which drive a second circular belt on a right side and on a left side of the module or a longitudinal transportation of a stack or of returned goods,
        wherein the gate motor is horizontally arranged and supports a first rubber roller and a first friction wheel on a drive shaft, and
        wherein an eccentrically supported second friction wheel is driven by the first friction wheel when the gate motor runs.

2. The arrangement according to claim 1,
    wherein the modules are plug inserted one after the other on a cable conduit made from plastic material which is put together from sections, and
    wherein the cable conduit is mounted on hinged supports.

3. The arrangement according to claim 1, further comprising automatic gates for return which are arranged on a right side and on a left side of a path formed by the plural identical modules.

4. The arrangement according to claim 1, wherein an automotive battery is provided to drive the arrangement.

5. The arrangement according to claim 1,
    wherein twelve modules are plug inserted one after the other on a cable conduit made from plastic material which is put together from approximately 1 m long sections, and
    wherein the cable conduit is mounted on six hinged supports.

6. The arrangement according to claim 1, further comprising twenty five automatic gates for return which are arranged on a right side and on a left side of a path of 6 m length formed by the plural identical modules.

7. A method for operating an arrangement of modules comprising the steps of:
    providing plural identical modules including a drive motor and a gate motor,
        wherein the plural identical modules are usable for the commissioning of print products and for the return of print products,
        wherein both the drive and gate motors run forward and backward,
        wherein the drive motor is provided with a label path sensor for a drive,
        wherein the gate motor is provided with a label path sensor for a gate,
        wherein the drive motor is arranged so that it hangs downward at an angle and supports a large pulley on a drive shaft of a gearbox for a first circular belt driving a quick-release axle on an output side of a module,
        wherein two pulleys are mounted on the quick-release axle which drive a second circular belt on a right side and on a left side of the module or a longitudinal transportation of a stack or of returned goods,
        wherein the gate motor is horizontally arranged and supports a first rubber roller and a first friction wheel on a drive shaft, and
        wherein an eccentrically supported second friction wheel is driven by the first friction wheel when the gate motor runs,
    assigning individual packages to individual pickers; and
    having the individual packages worked on by the individual pickers simultaneously in parallel so that each picker performs his tasks independently and his work pace is not determined by a work pace of other pickers.

8. The method according to claim 7, wherein each picker working on the arrangement simultaneously receives pick instructions acoustically by voice and optically.

9. The method according to claim 8,
    wherein each picker is provided with a device including a loudspeaker, a micro computer including a display, and
    wherein up to 20,000 pick lines are stored in the micro computer.

10. The method according to claim 9,
    wherein the display is provided as a color display, and
    wherein a color of the display changes with every new instruction of the device to a color which identifies a storage location.

11. The method according to claim 10, wherein the microcomputer is formed by a modified MP3/MP4 player.

* * * * *